A. C. JOHNSON.
LIFTING DEVICE FOR DRAFT IMPLEMENTS.
APPLICATION FILED MAY 26, 1919.
1,356,770.
Patented Oct. 26, 1920.
2 SHEETS—SHEET 1.
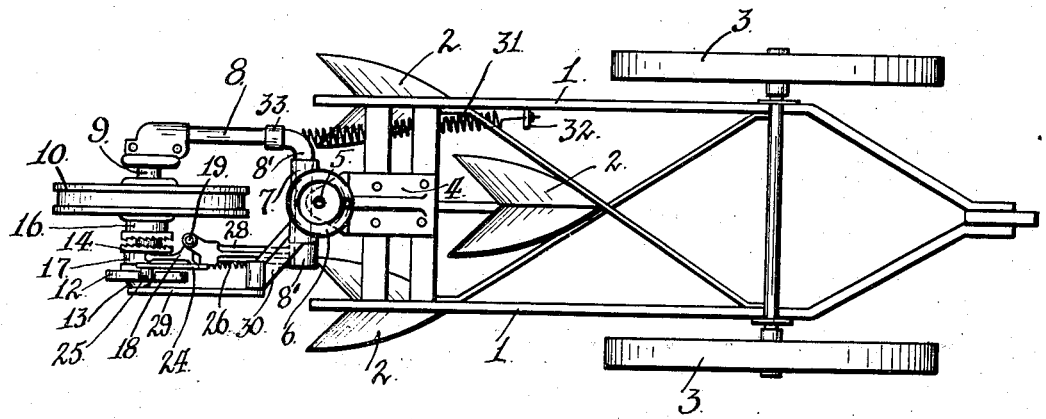
Fig-2-
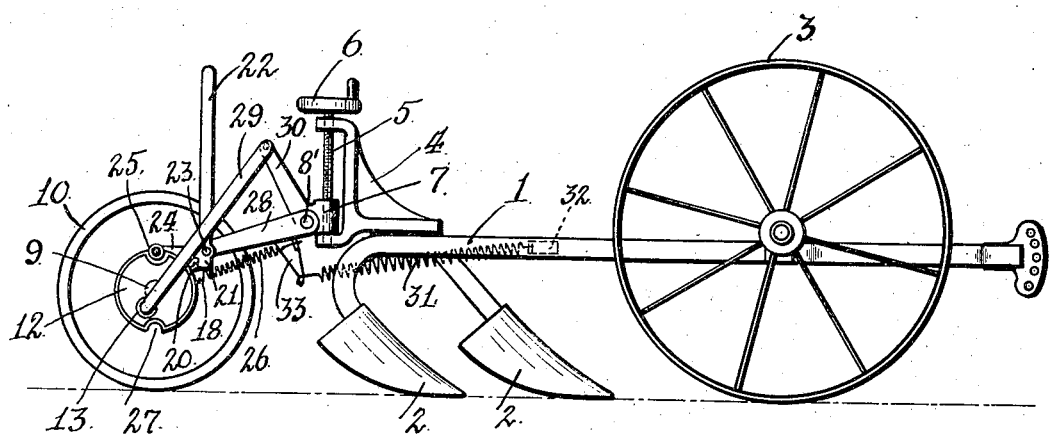
Fig-1-
WITNESS
W<sup>m</sup> F. Drew
INVENTOR
Alfred C. Johnson
BY
Booth & Booth
ATTORNEYS

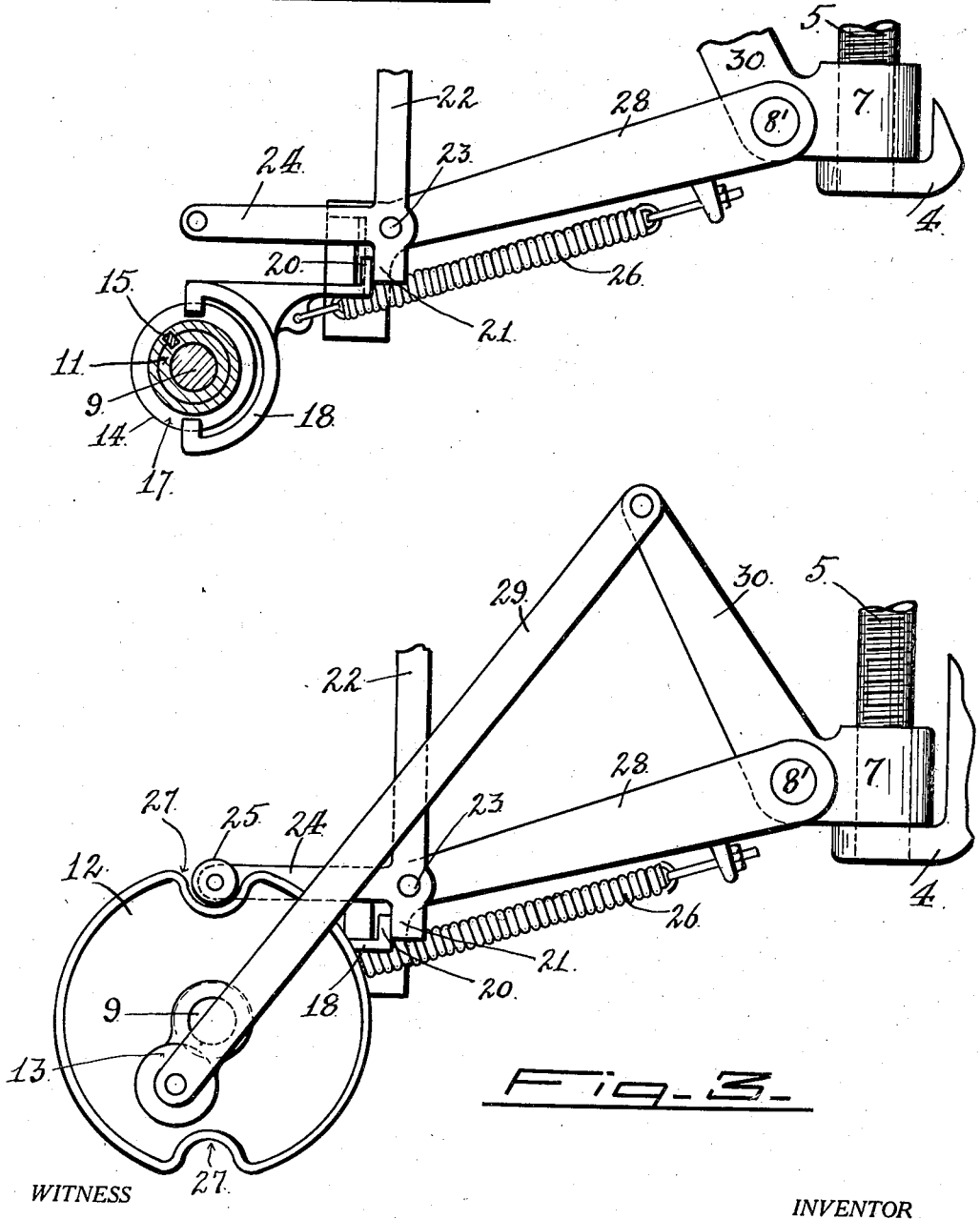

UNITED STATES PATENT OFFICE.

ALFRED C. JOHNSON, OF SAN JOSE, CALIFORNIA.

LIFTING DEVICE FOR DRAFT IMPLEMENTS.

1,356,770.          Specification of Letters Patent.     Patented Oct. 26, 1920.

Application filed May 26, 1919. Serial No. 299,827.

*To all whom it may concern:*

Be it known that I, ALFRED C. JOHNSON, a citizen of the United States, residing at San Jose, in the county of Santa Clara and State of California, have invented certain new and useful Improvements in Lifting Devices for Draft Implements, of which the following is a specification.

My invention relates to a lifting device for vehicles and implements.

One object of my invention is to provide a device by which at the will of the operator, the vehicle or implement may be lifted clear of the ground, without in any way interfering with its normal operation. Another object is to provide a complete self-contained device which may be readily connected to any kind of vehicle or implement and which can be readily removed from one vehicle or implement and attached to another. Still another object is to provide a device for the purpose, which is strong, simple to operate, and cheap to construct.

My invention is herewith described and illustrated as applied to a cultivator, but it is to be understood that it is equally well adapted for use in connection with other vehicles and implements. The device is entirely self-contained and may be attached to any vehicle or implement without alteration thereof as it is not built into the structure nor necessarily a permanent part thereof.

My invention will now be fully described with reference to the accompanying drawings, wherein:

Figure 1 is a side elevation of my lifting device as applied to a cultivator.

Fig. 2 is a plan view of the same.

Fig. 3 is a detailed side-view, enlarged, of a portion of my lifting device, showing the lifting crank and connecting link.

Fig. 4 is a view similar to Fig. 3, the crank and connecting link being removed to show a portion of the clutch and operating mechanism therefor.

1 designates the frame of a draft implement, here shown as a cultivator, having teeth or blades 2, and wheels 3 adapted to support the forward end of said frame. A yoke member 4, secured to the frame 1 carries a vertically disposed rotatable screw 5, operated by means of a hand wheel 6, Figs. 1 and 2.

A bracket 7, is threaded and supported on said screw and has journaled in it by a transverse portion 8′ a rearwardly extending arm 8, Fig. 2, adapted for vertical swinging movement. The rear of said arm 8 carries a transverse, horizontal axle spindle 9, upon which is mounted a freely rotatable ground-running wheel 10, Figs. 1 and 2.

The spindle 9 has mounted upon it a freely rotatable sleeve 11 which carries a cam 12 and a crank 13, Figs. 1, 2 and 3. A clutch member 14, Figs. 2 and 4, is slidably mounted on the sleeve 11, and is caused to rotate therewith by a key or feather 15, Fig. 4. Said clutch member 14 is provided with teeth upon its face adapted to engage co-acting teeth formed upon the face of the hub 16 of the wheel 10, Fig. 2.

Engagement of said teeth is effected by sliding the clutch member 14 longitudinally upon the sleeve 11. For this purpose said clutch member is provided with a groove 17, Figs. 2 and 4, in which the ends of a yoke 18 ride. Said yoke is carried upon a vertical pivot 19, Fig. 2, and is provided with a lug 20, Figs. 3 and 4, adapted to be engaged by a finger 21 on the lower end of a lever 22. Said lever is pivoted at 23, and has a rearwardly extending arm 24 carrying a roller 25 adapted to ride upon the cam 12, Figs. 1 and 3. A spring 26 normally holds the yoke 18 over in such a position that the clutch member 14 is disengaged from the wheel 10.

The cam 12 is formed with two diametrically opposite depressions 27. An arm 28, secured to the projecting free end of the transverse journaled portion 8′ of the arm 8, and extending rearwardly therefrom, supports the pivots 19 and 23 of the clutch yoke 18 and the lever 22 respectively. A link 29, Figs. 1, 2 and 3, connects the crank 13 with an inwardly directed arm 30 of the bracket 7.

The operation of the device is as follows:

Under normal conditions, the wheel 10 revolves in running upon the ground, and the clutch member 14, the cam 12 and the crank 13 remain stationary in the position shown in the drawings. When it is desired to lift the cultivator to free its teeth from the ground, the lever 22 is moved forwardly, thus causing, by the contact of its finger 21 with the lug 20, the side swing of the yoke 18 on its pivot 19, and this movement of the yoke slides the clutch member 14 into engagement with the clutch-hub 16 of the wheel 10, and at the same time by the arm 24 lifts the cam roller 25 out of the depression 27 in the cam 12. The cam 12 and the crank 13 being now connected through their sleeve 11 and the clutch members, with the wheel 10, rotate with said wheel.

The roller 25, riding upon the circular elevated portion of the cam 12, holds the lever 22 in the forward position and causes the clutch member 14, to remain in engagement with the wheel 10, for a half-revolution, when said roller 25 dropping into the opposite depression 27 of the cam 12, effects the release of said clutch and allows the crank 13 to come to rest. During this time, however, said crank has made a half-revolution from the position shown in the drawings, thus, through the link 29 and arm 30, lifting the bracket 7, and thereby raising the entire rear end of the cultivator. Said cultivator is lowered by a similar operation, the crank 13 traveling through another half revolution.

A spring 31, Figs. 1 and 2 extends, under tension, between brackets 32 and 33, the former secured to the frame 1 of the cultivator and the latter to the arm 8. Said spring causes the wheel 10 to normally carry a portion of the weight of the cultivator, thereby giving said wheel sufficient initial traction to enable it to begin to lift the cultivator without slipping. When the lifting movement has started the entire weight of the rear end of the cultivator is thrown upon the wheel 10, giving it ample traction to continue the operation. This spring 31 is however not essential to the working of the device nor its self-contained character.

The bracket 7, being carried by the vertical screw 5, is not only adjustable vertically, to regulate the height of the cultivator with respect to the ground, but it also has a lateral swinging movement to enable the wheel 10 to track properly when operating on a curve.

It is to be noted that my device as herein illustrated raises the rear end of the draft implement. This is of particular advantage for plows, cultivators, road scrapers and the like, for the reason that it enables the point or edge of such implement to enter the ground much more readily, when said rear end is again lowered, than would be the case if the forward end of the implement were raised, or if the entire implement were raised. But it is to be understood that this location is not imperative nor essential, as the device being self-contained may be attached to the implement in any position desired, and may be removed from one implement and placed on another; nor is my invention to be confined to a single lifting wheel.

I claim:

1. A lifting device for implements comprising a member, means for attaching said member to the implement adapting it for vertical adjustment and lateral pivotal movement, a swinging arm carried by said member; a ground-running wheel carried by said arm; connections between said wheel and said member whereby said member is lifted by the rotation of said wheel; and means for throwing said connections into and out of action.

2. A lifting device for implements comprising a member, means for securing said member to the implement adapting it for vertical adjustment and lateral pivotal movement, an arm having at one end a transverse portion journaled in said member adapting it for vertical swinging movement, and having at its other end a spindle at right angles, a ground-running wheel rotatably carried by said spindle; a crank rotatably carried by said spindle and normally free of said wheel; means for causing said crank to rotate with said wheel; and a connection between said crank and said member whereby said member is lifted by the rotation of said crank.

3. A lifting device for implements comprising a yoke secured to the implement; a vertically disposed screw rotatably mounted in said yoke; a member fitted on said screw for vertical adjustment and lateral movement; an arm pivotally mounted in said member; a ground-running wheel rotatably carried by said arm; a crank rotatably carried by said arm and normally free of the wheel; means for throwing said crank into and out of rotative connection with the wheel; means connecting the crank with said member to lift said member and the implement by the rotation of the crank; and means associated with said crank for automatically throwing said connections into and out of action.

4. A lifting device for implements comprising a member secured to the implement; means for vertically adjusting said member; an arm pivotally mounted in said member; a ground-running wheel rotatably carried by said arm; a crank rotatably carried by said arm and normally free of the wheel; means for throwing said crank into and out of rotative connection with the wheel; means connecting the crank with said member to lift said member and the implement by the rotation of the crank; and means associated with said crank for automatically throwing said connections into and out of action.

5. A lifting device for implements comprising a member carried by the implement and adjustable vertically with respect thereto; an arm pivotally mounted in said member and extending therefrom; a ground-running wheel carried by said arm; a rotatable crank carried by said arm and normally free of said wheel; a clutch for connecting said crank in driving relation with said wheel; means for manually engaging said clutch; means for automatically releasing said clutch, and a connection between said crank and said member for raising the latter.

In testimony whereof I have signed my name to this specification in the presence of two subscribing witnesses.

ALFRED C. JOHNSON.

Witnesses:
 WM. F. BOOTH,
 S. CONSTINE.